April 13, 1948. M. J. NAPIER 2,439,780
COOKING APPARATUS
Filed Feb. 28, 1945

INVENTOR
MELVIN J. NAPIER
By
ATTORNEYS

Patented Apr. 13, 1948

2,439,780

UNITED STATES PATENT OFFICE 2,439,780

COOKING APPARATUS

Melvin J. Napier, Akron, Ohio, assignor to Miami Boiler & Machine Company, Inc., Akron, Ohio, a corporation of Ohio Application February 28, 1945, Serial No. 580,234

5 Claims. (Cl. 99—443)

This invention relates to cooking apparatus, and more especially it relates to apparatus for continuously cooking organic material.

The invention is of utility in any situation where continuous cooking under pressure is desired, and is especially useful in situations where concurrent stirring and agitation of the cooking material is desired so as to effect substantial disintegration of lumps therein. Such a use is shown in my copending application for Letters Patent on Art of processing organic material, Serial No. 580,233, filed concurrently herewith, wherein the cooker is employed for treating waste materials from food processing plants, particularly waste fish products.

The chief objects of the invention are to provide in an improved manner for the cooking of organic material under pressure; to provide for the continuous cooking of organic material while it is under pressure; and to provide for subjecting the material to a disintegrating action as it passes through the cooker. Other objects will be manifest as the description proceeds.

Figure 1:
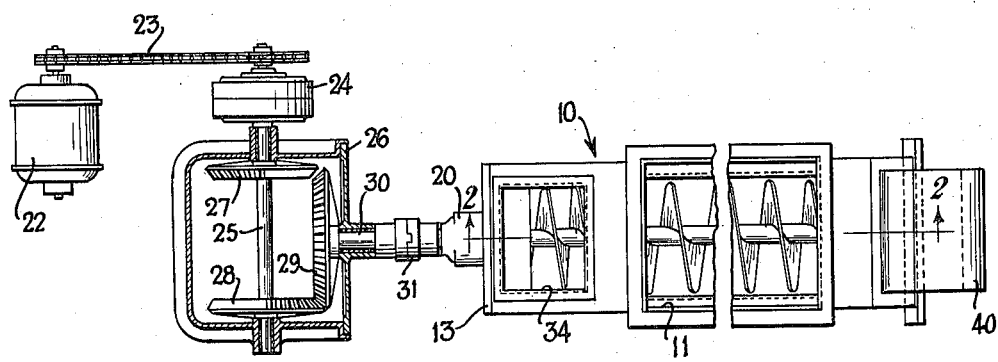
Figure 2:
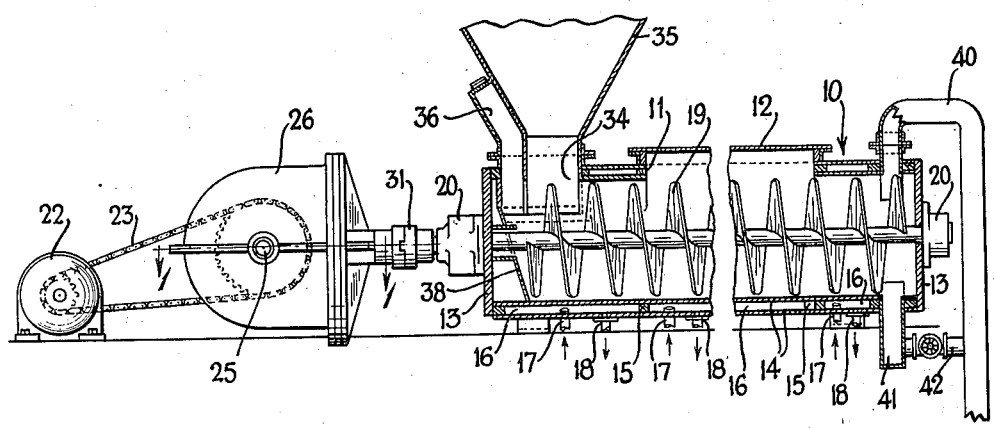

An illustrative embodiment of the invention is shown in the accompanying drawing of which:

Fig. 1 is a plan view of the improved cooking apparatus, a cover thereof being removed, and a portion being shown in section on the line 1—1 of Fig. 2; and Fig. 2 is a section on the line 2—2 of Fig. 1, the driving means of the apparatus being shown in side elevation.

Referring to the drawing, there is shown an elongate cooker designated as a whole by the numeral 10, said cooker having a casing of general cylindrical shape, and having an opening 11 in the top thereof, said opening normally being closed by a cover 12. The latter is removed when it is desired to clean out the interior of the cooker. The cylindrical casing of the cooker has end walls 13, 13 of single thickness, and double, spaced-apart cylindrical walls 14, 14, the space between the latter being utilized for the circulation of steam by means of which the material in the cooker is heated and cooked. The space between walls 14 is circumferentially divided by partitions 15, 15 into a plurality of steam chambers 16, 16, each of which is provided with a steam inlet pipe 17 and an outlet pipe 18. The arrangement is such that different temperatures may be maintained in different longitudinal regions of the cooker. Located interiorly of the cooker and extending axially from end to end thereof is a feed screw 19, which screw is journaled in bearing 20, 20 carried by the respective end walls 13 of the cooker casing.

The screw 19 is driven by an electric motor 22 that drives through sprocket chain 23 into a variable speed device 24, the latter driving a shaft 25 that extends through and is journaled in a gear case 26. Secured upon shaft 25, interiorly of gear case 26, are mutilated bevel gears 27 and 28, which gears are arranged to mesh, in alternation, with a bevel gear 29. The latter is mounted upon a shaft 30 that extends from the gear case and is connected to the shaft of feed screw 19 through the agency of a coupling 31. The arrangement is such that the gear 27, when engaged with gear 29, drives the feed screw 19 in the direction that feeds the material from the receiving end of the cooker, which is at the left thereof as shown in the drawing, toward the delivery end of the cooker, which is at the right thereof. When the mutilated gear 28 is in mesh with gear 29, the feed screw is turned in the opposite direction. The gear 27, however, has more teeth than the gear 28, so that the forward movement of the material being cooked is greater than its reverse movement, with the result that said material slowly is moved toward the delivery end of the cooker. By means of the variable speed device 24, the cooking time and the capacity of the cooker can be controlled, which features are advantageous when the apparatus is employed for cooking different materials. For example, material may require thirty minutes to pass through the cooker, of which ten minutes constitutes a warm-up period and twenty minutes is actual cooking time.

The raw material to be cooked enters the cooker through a receiving opening 34, Fig. 1, at the left end of the cooker as shown in the drawing, said opening 34 being located at the lower end of a feed chute 35, Fig. 2, through which the material moves by gravity from any suitable storage receptacle (not shown). Beside the chute 35 and open at its bottom to the interior of the cooker is a pressure release chamber 36, there being an obliquely arranged deflector plate 38 for deflecting material into said chamber. Material being cooked is moved toward the inlet end of the cooker when the screw 19 turns in reverse direction, and the presence of chamber 36 enables some of the backward-moving material to move thereinto at that time, whereby excessive back pressure is obviated.

Cooked material is discharged from the cooker at the end thereof shown at the right in the drawing, at which end is located a discharge chute 40. The chute 40 communicates with the interior of the cooker at the top thereof, thereby requiring that the cooked material be forced upwardly into the chute, whereby substantial pressure is maintained on the material in the cooker. Extending downwardly from the cooking chamber, at the discharge end thereof, is a sump 41 wherein foreign objects may collect, and from which they subsequently may be removed. There is a valved by-pass 42 of small capacity connecting the sump 41, a little above the bottom thereof, with the chute 40, to enable cooked material to move into and out of the sump.

In the operation of the apparatus, the coarsely chopped product to be cooked moves by gravity down the chute 35 and into the cooker, being there engaged by the feed screw 19 and slowly advanced thereby toward the delivery end of the cooker. The material moves about one-third the length of the cooker before it attains cooking temperature, and then is cooked while it traverses the remainder of the distance through the cooker. Since the cold material enters the cooker at the extreme end thereof, such material is thoroughly warmed before entering the cooking region of the apparatus, so that the cooking mass is not affected by the introduction of cold material, as is the case in some cooking methods. The cooked material requires to be forced upwardly at the delivery end of the apparatus so as to move into chute 40, and this resistance to free movement of the product results in the building up of pressure on the product in the cooker. Because the screw 19 imparts forward and reverse movement to the cooking mass of material, the latter is stirred and agitated, whereby substantial disintegration thereof is effected.

The apparatus is simple in construction and efficient in operation, and achieves the several advantages set out in the foregoing statement of objects.

Modification may be resorted to without departing from the spirit of the invention, or the scope thereof as defined by the appended claims.

What is claimed is:

1. In cooking apparatus of the character described, the combination of a cooking chamber having a receiving opening at one end and a discharge opening at the other end, means for heating the chamber, means for intermittently forcing material through said chamber and out of said discharge opening while concurrently stirring and agitating the material by imparting limited reciprocatory movement thereto, and means for maintaining the material under pressure while in said chamber, said means for intermittently forcing material through said chamber comprising a rotating feed screw, a gear fixed to the feed screw, and a pair of constantly driven mutilated gears operatively engaging said screw gear in alternation at opposite sides of the axis thereof.

2. In cooking apparatus of the character described, the combination of a substantially closed cooking chamber and means for heating the same, means for introducing material to be cooked into the chamber at one end thereof, means for discharging cooked material from the chamber at the opposite end thereof, and mechanical means for continuously forcing material through the chamber by a continuous succession of increments each comprising a movement forward followed by a movement of less extent in the reverse direction, said last named means comprising a rotating feed screw, a gear fixed to the feed screw, and a pair of constantly driven mutilated gears operatively engaging said feed screw in alternation at opposite sides of the axis thereof, one of said mutilated gears having more teeth than the other.

3. In cooking apparatus for organic material, the combination of a cooking chamber and means for heating the same, means for introducing material to be cooked into the chamber at one end thereof, means for discharging cooked material from the chamber at the opposite end thereof, a feed screw in said chamber extending from end to end thereof, and means including intermittently operating mutilated gears operatively connected to said screw for continuously oscillating said screw first in one direction and then to a less extent in the opposite direction.

4. In cooking apparatus for organic material, the combination of a cooking chamber and means for heating the same, means for introducing material to be cooked into the chamber at one end thereof, means for discharging cooked material from the chamber at the opposite end thereof, a feed screw in said chamber extending from end to end thereof, and means for continuously oscillating said screw first in one direction and to a less extent in the opposite direction, said last named means comprising a gear fixed to the feed screw, and a pair of constantly driven mutilated gears operatively engaging said screw gear in alternation at opposite sides of the axis thereof, one of said mutilated gears having fewer teeth than the other.

5. In cooking apparatus of the character described, the combination of a cooking chamber and means for heating the same, means for introducing material to be cooked into the chamber at one end thereof, means for discharging cooked material from the chamber at the opposite end thereof, means for forcing material through the chamber by increments that comprise a movement forward followed by rearward movement of less extent, a pressure release chamber that opens into the cooking chamber adjacent the material receiving end of the latter for preventing the building up of excessive pressure in the material during rearward movement thereof, and a deflector for deflecting material into said pressure release chamber, said last named means comprising a rotary feed screw and including mutilated gearing operatively connected to said screw for periodically rotating said screw in opposite directions, rotation in one direction being of greater angular extent than rotation in the opposite direction.

MELVIN J. NAPIER.

REFERENCES CITED

The following references are of record in the file of this patent:

UNITED STATES PATENTS

| Number | Name | Date |
| --- | --- | --- |
| 145,581 | Merril et al. | Dec. 15, 1873 |
| 285,736 | Dopp | Sept. 25, 1883 |
| 959,448 | Baxter | May 31, 1910 |
| 1,358,309 | Goodhue et al. | Nov. 9, 1920 |
| 1,368,351 | Purrington | Feb. 15, 1921 |
| 1,545,596 | Olney | July 14, 1925 |
| 1,565,282 | Mabee | Dec. 15, 1925 |
| 2,232,545 | Lum | Feb. 18, 1941 |
| 2,240,338 | Locke | Apr. 29, 1941 |

FOREIGN PATENTS

| Number | Country | Date |
| --- | --- | --- |
| 29 | Denmark | Apr. 29, 1895 |
| 313,843 | Italy | Jan. 9, 1934 |